Patented Sept. 10, 1940

2,214,117

UNITED STATES PATENT OFFICE 2,214,117

PREPARATION OF AROMATIC 1,3-DIKETONES

Albert Bernard Boese, Jr., Pittsburgh, Pa., assignor to Carbide and Carbon Chemicals Corporation, a corporation of New York No Drawing. Application March 5, 1938, Serial No. 194,178

17 Claims. (Cl. 260—592)

The present invention relates to the production of aromatic 1,3-diketones, and more especially it concerns the preparation of aryl alkyl diketones from diketene and aromatic hydrocarbons and substituted aromatic hydrocarbons.

Aromatic 1,3-diketones previously have been prepared by condensing an aryl alkyl ketone with an aliphatic ester, using sodium, sodamide, or sodium ethylate as condensing agents; or by condensing an ester of an aromatic carboxylic acid with an aliphatic ketone, using the same condensing agents. In these prior methods, however, the yields of diketones are low and the reactants relatively expensive so that these diketones cannot be produced economically for commercial use.

The present invention is based in important part upon the discovery that aryl alkyl 1,3-diketones may be readily and economically prepared by reacting diketene with an aromatic hydrocarbon or substituted aromatic hydrocarbon in the presence as a condensing agent of aluminum chloride.

In the practice of the invention in a preferred form, diketene is introduced slowly at a controlled rate into and is rapidly and intimately mixed with a suspension of anhydrous aluminum chloride in an excess of the aromatic hydrocarbon or substituted aromatic hydrocarbon maintained at around room temperature. Preferably the reaction is conducted under atmospheric pressure, although higher or lower pressures may be employed if desired. Among the hydrocarbons and hydrocarbon derivatives found particularly suitable for use in the process are benzene and its homologues, and substituted benzenes in which the substituent is free from unsaturation and may, for example, be an alkoxy, aryloxy, bromo, or chloro group.

In the case of the use of those hydrocarbons and derivatives thereof which are solids at room temperature, the same may be employed in solution in volatile solvents which are inert to the reactants such, for example, as carbon disulfide or petroleum ether. In most instances where normally liquid hydrocarbons are used as starting materials, an excess thereof is employed over that required for reacting with the diketene to produce the desired diketones. Instead of using inert solvents, it is possible to employ one which itself reacts with diketene in the presence of the condensing agents of the invention to yield complexes from which 1,3-diketones may be recovered, such as, for example, benzene and nitro-benzene.

An exothermic reaction takes place with evolution of hydrogen chloride. The temperature of the reaction mixture is maintained below 70° C., and preferably below 60° C. to prevent the occurrence of undesirable side reactions which decrease the yield and purity of the 1,3-diketones formed. In the reaction the aluminum chloride acts as a catalyst. However, since it forms a complex with the product of the condensation reaction and is thus withdrawn from the sphere of reaction, it must be present in more than catalytic proportions. Thus it has been found that the best yields are obtained when around two moles of aluminum chloride are present for each mole of diketene which is reacted.

After all of the diketene has been added, the reaction mixture preferably is heated for several hours on a steam bath to insure complete reaction. The aluminum chloride complex then is decomposed by water to liberate the desired 1,3-diketone. Generally, this is best accomplished by introducing the entire reaction mixture into cold water containing a mineral acid such as sulfuric acid or hydrochloric acid, following which the solvent and/or unreacted starting materials are removed by a steam distillation. The residual aqueous mixture then is refluxed for several hours to complete the decomposition of the aluminum chloride complex. The reaction product or aromatic 1,3-diketone may be separated from the mixture in various ways as, for example, by steam distillation, or by extracting it from the reaction mixture by a suitable solvent, such as ether, after cooling the mixture. In instances where the desired product is a solid, it is most conveniently removed by filtration, and subsequently is purified by recrystallization or distillation. When the product is a liquid, it may be extracted by a suitable solvent and purified by distillation, preferably under subatmospheric pressure.

The following examples are presented merely for purposes of illustrating the invention:

*Example 1*

Over a period of two hours, 91 grams of diketene were added dropwise to a vigorously stirred suspension of 290 grams of anhydrous aluminum chloride in 400 cc. of benzene. An exothermic reaction took place and hydrogen chloride was evolved. The temperature was maintained between 45° and 55° C. by means of suitable cooling. After addition of the diketene, the reaction mixture was refluxed for one hour, and was then decomposed by pouring it while still warm into 1000 grams of ice water containing 150 cc. of concentrated hydrochloric acid. After removing the excess benzene by steam distillation, the reaction mixture was refluxed for three hours, cooled, and extracted with ether. The ether extract was dried over anhydrous sodium sulfate and, after distilling off the ether, was fractionated under subatmospheric pressure. Thus were obtained 120 grams of benzoyl acetone, which boiled within the range between 160° and 165° C. under an absolute pressure of 25 mm. of mercury. This represents a yield of 68.4% based on the diketene employed. Upon cooling, the distillate solidified to a colorless crystalline solid which melted at 68°–69° C. The reaction involved may be represented by the following equation:

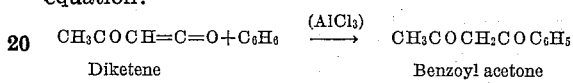

Diketene          Benzoyl acetone

*Example 2*

Sixteen grams of diketene were slowly added with stirring to a suspension of 50 grams of anhydrous aluminum chloride in 100 cc. of toluene while maintaining the reaction temperature between 20° and 25° C. Following the addition of the diketene, the reaction mixture was heated on a steam bath for three hours, and was then decomposed by pouring it into 200 cc. of ice water containing 30 cc. of concentrated hydrochloric acid. After distilling off the toluene with steam, the residual aqueous mixture was refluxed for two hours. After cooling the mixture, the same was extracted with benzene to remove the reaction product, which was a dark oil. After distilling off the benzene from the resultant extract, the reaction product was fractionated under an absolute pressure of 5 mm. of mercury, yielding 23 grams of toluyl acetone in the form of a pale yellow liquid which distilled within the range between 110° and 112° C. under that pressure, representing a yield of 69.6% based upon the diketene employed.

*Example 3*

Twenty-three grams of diketene were introduced dropwise with constant agitation over a period of one hour to a suspension of 75 grams of anhydrous aluminum chloride in 150 cc. of chlorbenzene. During the resultant exothermic reaction with evolution of hydrogen chloride, the temperature of the mixture was maintained between 45° and 55° C. After the addition of all the diketene, the reaction mixture was heated with agitation at a temperature between 60° and 70° C. for three hours and was then poured into 500 cc. of ice water containing 25 cc. of concentrated hydrochloric acid, thereby decomposing the aluminum chloride complex and liberating p-chlorbenzoyl acetone. After removing from the reaction mixture the excess chlorbenzene by steam distillation, the residual mixture was refluxed for three hours, then cooled to room temperature. The product which crystallized out was separated on a filter, washed with water and air dried. There were obtained 39 grams of p-chlorbenzoyl acetone, representing a yield of 70.6% based upon the diketene employed. Upon recrystallization thereof from dilute 50% methanol this compound occurred as colorless needles which melted at 73°–74° C. It is soluble in the common organic solvents, such as alcohols, ethers, ketones, esters and aromatic hydrocarbons, and in dilute solutions of caustic alkalies; but is insoluble in water and aliphatic hydrocarbons. An examination of this product has established that the aceto-acetyl group is present in the benzene ring in the para position to the chlorine atom. The following equation illustrates the general nature of the reaction involved:

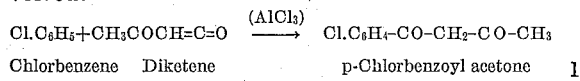

Chlorbenzene    Diketene        p-Chlorbenzoyl acetone

*Example 4*

To a suspension of 133 grams of anhydrous aluminum chloride in 300 cc. of diphenyl ether, 42 grams of diketene were slowly added with stirring over a period of 45 minutes. An exothermic reaction took place, and hydrogen chloride was evolved, the temperature during the reaction being kept between 45° and 50° C. When the diketene had all been added, the mixture was heated with stirring at 70°–80° C. for 90 minutes, then poured into 750 cc. of cold water containing 75 cc. of concentrated hydrochloric acid. This mixture was refluxed for one hour, then cooled, and extracted with ether. The extract was dried over anhydrous sodium sulfate, the ether distilled off, and the residue fractionated under subatmospheric pressure. After removal of the unreacted diphenyl ether, there were obtained 78 grams of p-phenoxy benzoyl acetone as a viscous liquid which distilled at between 210° and 220° C. at an absolute pressure of 4 mm. of mercury. On standing, the liquid solidified to a crystalline mass which, after recrystallization from methanol, occurred as a colorless crystalline solid which melted at 80°–81° C. The yield was 61% based on the diketene employed.

p-Phenoxy benzoyl acetone is soluble in ethers, alcohols, esters, ketones, and aromatic hydrocarbons, but insoluble in aliphatic hydrocarbons and water. The reaction involved may be represented by the following equation:

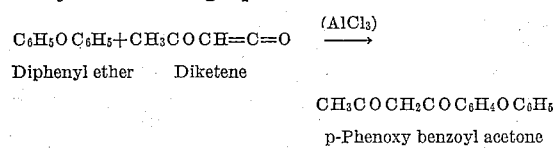

Diphenyl ether    Diketene p-Phenoxy benzoyl acetone

In practicing the invention, ferric chloride has some very limited catalytic action, but is not a satisfactory substitute for aluminum chloride, and provides low yields of the 1,3-diketones. It is possible to substitute for the dilute aqueous solution of hydrochloric acid employed in the examples for decomposing the metallic chloride complexes formed in the initial reaction between diketene and the aromatic hydrocarbon or derivative thereof, other dilute solutions of mineral acids, such as sulfuric acid.

The aryl alkyl 1,3-diketones, particularly benzoyl acetone and its homologues, have apparent commercial applications in numerous fields. In alkaline media they couple with diazonium compounds to form an interesting series of mordant dyestuffs. They are exceptionally good solvents for vinyl resins; and apparently have value as plasticizers. They form with practically all metals salts which belong to the so-called group of chelated metallic derivatives and are exceptionally soluble in organic solvents. As such, their use as resin stabilizers and oil conditioning agents is indicated. With aniline and its derivatives, anilino derivatives are formed which may be dehydrated to substituted quinaldines, the parent substances of Cyanine dyes used as photographic sensitizers. When reacted with hydroxylamines and hydrazines, they form isoxazoles and pyrazoles, respectively.

The term "a benzene" is used in the accompanying claims to designate both benzene and the homologues thereof.

The invention is susceptible of modification within the scope of the appended claims.

I claim:

1. Process which comprises reacting diketene with a benzene, in the presence of aluminum chloride.

2. Process as defined in claim 1 wherein the said benzene is employed in solution in a volatile solvent.

3. Process which comprises reacting diketene with an aromatic compound selected from the group consisting of benzene, benzene homologues, and substituted benzenes in which the substituent is a saturated group selected from the class consisting of alkoxy, aryloxy, bromine and chlorine groups, in the presence of aluminum chloride, while maintaining the reaction mixture at a temperature not substantially higher than 70° C.

4. Process of preparing an aryl alkyl 1,3-diketone, which comprises reacting diketene in the presence of aluminum chloride, with a benzene decomposing the aluminum chloride complex thus produced, and separately recovering from the resultant reaction mixture the liberated aryl alkyl 1,3-diketone.

5. Process of preparing an aryl alkyl 1,3-diketone, which comprises reacting diketene in the presence of aluminum chloride, with a benzene, while maintaining the reaction mixture at a temperature not substantially above 70° C., decomposing the aluminum chloride complex thus produced, and separately recovering from the resultant reaction mixture the liberated aryl alkyl 1,3-diketone.

6. Process of preparing an aryl alkyl 1,3-diketone, which comprises reacting diketene in the presence of aluminum chloride, with a compound selected from the group consisting of benzene, benzene homologues, and those substituted benzenes in which the substituent is a saturated group selected from the class consisting of alkoxy, aryloxy, bromine and chlorine groups, decomposing with water in the presence of a dilute mineral acid the aluminum chloride complex thus produced, and separately recovering from the resultant mixture the thus-liberated aryl alkyl 1,3-diketone.

7. Process of preparing an aryl alkyl 1,3-diketone, which comprises reacting diketene in the presence of anhydrous aluminum chloride, with a solution in a volatile solvent of a compound selected from the group consisting of benzene, benzene homologues, and those substituted benzenes in which the substituent is a saturated group selected from the class consisting of alkoxy, aryloxy, bromine and chlorine groups, decomposing the metallic chloride complex thus produced, and separately recovering from the reaction mixture the liberated aryl alkyl 1,3-diketone.

8. Process as defined in claim 4 wherein the aluminum chloride is employed in a molar ratio of two moles thereof per mole of diketene employed.

9. Process for preparing an aryl alkyl 1,3-diketone, which comprises slowly introducing diketene into a suspension of anhydrous aluminum chloride in a liquid comprising an aromatic compound selected from the group consisting of benzene, benzene homologues, and those substituted benzenes in which the substituent is a saturated group selected from the class consisting of alkoxy, aryloxy, bromine and chlorine groups, while agitating the said suspension and maintaining the reaction mixture at a temperature not substantially above 70° C., thereafter decomposing the resultant aluminum chloride complex with a dilute solution of a mineral acid, and separately recovering from the reaction mixture the aryl alkyl 1,3-diketone thus liberated.

10. Process for preparing an aryl alkyl 1,3-diketone, which comprises slowly introducing diketene into a suspension of anhydrous aluminum chloride in a liquid comprising an aromatic compound selected from the group consisting of benzene, benzene homologues, and those substituted benzenes in which the substituent is a saturated group selected from the class consisting of alkoxy, aryloxy, bromine and chlorine groups, while agitating the said suspension and maintaining the reaction mixture at a temperature not substantially above 70° C., thereafter decomposing the resultant aluminum chloride complex with water in the presence of a dilute acid and liberating an aryl alkyl 1,3-diketone within the reaction mixture, removing excess of the said aromatic compound from the last-named reaction mixture, and thereafter separately recovering from the stripped reaction mixture the 1,3-diketone present therein.

11. Process for producing benzoyl acetone, which comprises reacting diketene and benzene in the presence of finely-divided anhydrous aluminum chloride, liberating benzoyl acetone from the aluminum chloride complex thus produced, and isolating and recovering the said benzoyl acetone.

12. Process for producing p-toluyl acetone, which comprises reacting diketene and toluene in the presence of anhydrous aluminum chloride, liberating p-toluyl acetone from the aluminum chloride complex thus produced, and recovering the said p-toluyl acetone.

13. Process for producing p-phenoxy benzoyl acetone, which comprises reacting diketene and diphenyl ether in the presence of aluminum chloride, and liberating p-phenoxy benzoyl acetone from the aluminum chloride complex thus produced.

14. As a new chemical compound, p-phenoxy benzoyl acetone, being a crystalline solid melting at 80° to 81° C., and soluble in alcohols and aromatic hydrocarbons but insoluble in aliphatic hydrocarbons and water.

15. Process of preparing an aryl alkyl 1,3-diketone, which comprises reacting diketene, in the presence of aluminum chloride, with a compound selected from the group consisting of benzene, benzene homologues, and those substituted benzenes in which the substituent is a saturated group selected from the class consisting of alkoxy, aryloxy, bromine and chlorine groups, decomposing the aluminum chloride complex thus produced, and separately recovering from the resultant reaction mixture the liberated aryl alkyl 1,3-diketone.

16. Process as defined in claim 15, wherein the aluminum chloride is employed in a ratio of 2 moles thereof per mole of diketene employed.

17. Process for preparing an aryl alkyl 1,3-diketone, which comprises slowly introducing successive portions of diketene into a suspension of aluminum chloride in a liquid comprising an aromatic compound selected from the group consisting of benzene, benzene homologues, and those substituted benzenes in which the substituent is a saturated group selected from the class thereof consisting of alkoxy, aryloxy, bromine and chlorine groups, while agitating the said suspension and maintaining the reaction mixture at a temperature not substantially above 70° C., decomposing the resultant aluminum chloride complex, and separately recovering the aryl alkyl 1,3-diketone thus liberated.

ALBERT B. BOESE, Jr.